United States Patent [19]

Van Gilder et al.

[11] 3,812,415

[45] May 21, 1974

[54] FERRORESONANT BATTERY CHARGER CIRCUIT

[75] Inventors: Burrows Corson Van Gilder, North Wales; Elmo Emerson Moyer, Pennsburg, both of Pa.

[73] Assignee: ELTRA Corporation, Toledo, Ohio

[22] Filed: Sept. 27, 1972

[21] Appl. No.: 292,644

[52] U.S. Cl. ................... 320/31, 320/35, 320/39
[51] Int. Cl. ............................................. H02j 7/04
[58] Field of Search ............... 320/9, 39, 40, 37, 38, 320/35, 36, 31

[56] References Cited
UNITED STATES PATENTS

| | | | |
|---|---|---|---|
| 3,341,763 | 9/1967 | Noddin | 320/39 |
| 3,521,147 | 7/1970 | Ostreicher | 320/39 X |
| 3,205,425 | 9/1965 | Moyer | 320/39 UX |
| 3,553,561 | 1/1971 | Lesher | 320/39 X |
| 3,278,823 | 10/1966 | Ross | 320/39 X |

Primary Examiner—J. D. Miller
Assistant Examiner—Robert J. Hickey

[57] ABSTRACT

A circuit for charging a storage battery is disclosed which uses a ferroresonant transformer in combination with a full-wave rectifier to supply direct current to charge the battery. The charging current is controlled by a single silicon controlled rectifier connected to substantially short circuit either all or a portion of one secondary winding of the transformer during increasing portions of half cycles of one polarity as the battery becomes charged. A voltage divider applies a preselected portion of the alternating current transformer output voltage, which is essentially the battery voltage, to gate the controlled rectifier. This preselected voltage is modified by the resistance varying characteristics of a thermistor which is responsive to heat produced by current through the controlled rectifier when it is conducting to reduce the current supplied to the battery. A lamp may be provided to visually indicate when the battery is charged.

12 Claims, 3 Drawing Figures

PATENTED MAY 21 1974 3,812,415

FERRORESONANT BATTERY CHARGER CIRCUIT

BACKGROUND OF THE INVENTION

In a battery charging circuit, it is desirable to control the charging current in accordance with the state of charge of the battery as indicated by its terminal voltage and its acceptance of current at that voltage, particularly during the final phase when the battery is approaching a fully-charged state. Ferroresonant transformers have been used for many years as voltage regulating devices, but these transformers depend upon the volt-second characteristics of an internal electromagnetic circuit with which the secondary is associated. Hence, ferroresonant transformers can do little to regulate the output voltage against variations in load current at the secondary terminals. If these transformers are used to supply rectifiers connected to charge batteries, the conditions at the battery will not adequately influence the charging voltage and current unless auxiliary controls are provided.

Ferroresonant transformers are known to provide an average value of output voltage which varies as little as ½ percent when the supply voltage is varied by as much as ± 10 percent, or more, provided the supply frequency is constant and the secondary load does not change. However, a typical ferroresonant power supply, for example, to supply 12.6 volts at 0.6 ampere direct current may have a voltage increase of about 5 percent during a change from full load current to 10 percent load current and another 5 percent voltage increase from this 10 percent load current to an essentially no load condition of about 1 milliampere, or less. The high no load voltage is about 13.8 volts, which is too great a value to "float" on a charged 6-cell lead-acid battery. On the other hand, 12.6 volts or more may be required to cause the battery to accept 0.6 amperes as it becomes charged. Thus, the terminal voltage at which a battery should be floated when fully charged is less than the terminal voltage required during charge because of the preponderance of the IR voltage drop internal to the battery cells at high values of charging current. This IR voltage drop becomes an insignificant portion of the battery terminal voltage at the very low current values required to float or maintain the battery in a fully-charged condition.

SUMMARY OF THE INVENTION

According to the present invention, a silicon controlled rectifier is provided to control the current supplied to a battery from a ferroresonant transformer. The controlled rectifier is rendered nonconductive when large amounts of charging current are accepted by a discharged battery, at which time the battery terminal voltage is low enough that the ferroresonant transformer is operating in its inherent current-limiting mode of maximum output current at that particular voltage. Since this current probably will not be the maximum current which the battery could accept in a discharged condition, the charger should be kept operating in the current-limiting mode while the terminal voltage of the battery increases to and then exceeds the float voltage value. This high-voltage point may be as much as 2.6 volts/cell as long as evolved gas is not excessive. The preselected voltage to which the controlled rectifier is responsive is set to this value by means of a voltage divider. When the voltage on the battery increases to the point that the controlled rectifier begins to conduct to reduce the charging current supplied to the battery, a thermistor is heated by the current through the controlled rectifier to lower the preselected voltage to maintain the controlled rectifier operative at such amounts of conduction as to maintain the terminal voltage of the charged battery at a desired float value.

A ferroresonant transformer may be short-circuited on its secondary side without delivering more current than its current-limiting mode safely allows unless the resonant capacitance is, in effect, short-circuited so thoroughly and non-inductively that it cannot oscillate into the reversed voltage states characteristic of ferroresonance. The conduction of the controlled rectifier when connected directly across the transformer load winding or across a portion of the resonant capacitance winding does not constitute a complete short-circuit of the resonant capacitance. This is because leakage reactance between windings or sections of a winding, which reactance is in effect in series with the controlled rectifier circuit, becomes an inductive energy store which commutates the capacitance voltage from a potential of one polarity to a potential of opposite polarity. However, the single controlled rectifier can initiate commutation only during one half-cycle, whereas the charged battery requires that the voltage be reduced during both half-cycles. It therefore becomes imperative that the resistance of the controlled rectifier current path be small relative to the inductance so that the direct current component of flux in the transformer core can cause the core to be driven into saturation on the succeeding half-cycle and produce commutation in the usual ferroresonant manner and with the proper timing to reduce the voltage during these half-cycles.

The disclosed circuit shows in series with the controlled rectifier an indicating lamp connected in shunt with a resistance which transfers heat to the thermistor. The lamp intensity is proportional to the controlled rectifier current. In some circuit designs, the lamp will blink slowly as the controlled rectifier operates in an intermittent manner to hold the battery voltage at a relatively low float value. This is probably due to a long or more effective L–R time constant of the controlled rectifier circuit. In other circuit designs, the lamp appears to stay on continuously once the controlled rectifier becomes operative. In any event, the lamp constitutes a useful indication of at least a substantial completion of the battery charge. The lamp also can be connected directly in series with the controlled rectifier if a lamp of suitable volt-amperage characteristics is available. The thermistor then can be heated either by the lamp instead of by a resistance or directly by the heat of the controlled rectifier.

Thus, it will be apparent that the present invention provides a control over the voltage in the secondary power circuit of a ferroresonant battery charging circuit. This control affects the charging current supplied to the battery to allow float charging of a fully-charged battery and also to prevent over-charging while allowing rapid charging. The invention further contemplates the provision of an optional visual signaling means which indicates a float charging state of the battery.

It is therefore a principal object of this invention to provide an improved circuit for the control of the output of a ferroresonant transformer.

It is another object of this invention to provide an improved circuit for charging storage batteries.

It is yet another object of this invention to provide an improved control of a ferroresonant transformer power supply for use in charging storage batteries to allow float charging and to prevent over-charging.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

DESCRIPTION OF THE PREFERRED EMBODIMENTS

Figure 1:
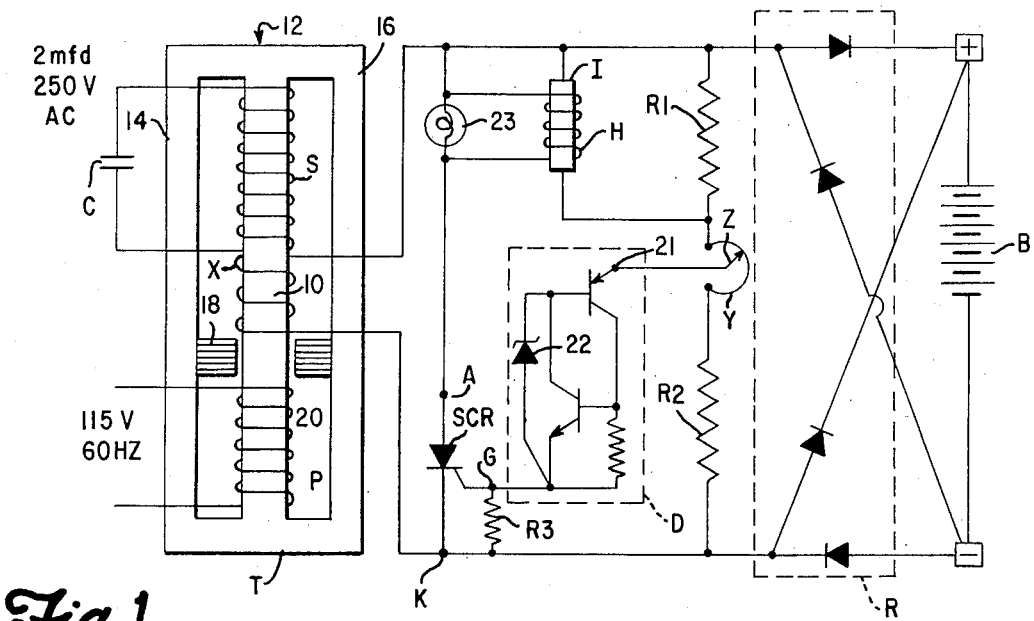
FIG. 1 is a schematic diagram of a direct current charging circuit for a battery combining a silicon controlled rectifier with a ferroresonant transformer which incorporates the invention for controlling the regulated output of the transformer.

Referring to the drawings and particularly to FIG. 1, a ferroresonant transformer T is shown having a primary winding P adapted for use with a commercial 115 volt alternating current power source having a 60 cycle frequency. The primary winding P may have 1,200 turns wound on a central branch 10 of a laminated core 12, which also has two outer branches 14 and 16. The outer branches 14 and 16 are provided with magnetic shunts 18 and 20, respectively, projecting inwardly toward the central branch 10 in a conventional manner. The magnetic shunts 18 and 20 are positioned between the primary winding P and two secondary windings S and X of the transformer T. The first secondary winding S is of 2,400 turns and is connected to a 2 mfd. capacitance C to form a resonant circuit. The second secondary X is of 146 turns and is adapted to supply alternating current power to a charging circuit for a 12 volt battery B in a manner which will be described hereinafter.

As is well known in the art, a ferroresonant transformer regulates the volt-seconds available in the power secondary winding to compensate for voltage variations in the power source energizing the primary winding. The sinusoidal excitation or primary voltage is separated from the squarish wave shape of the secondary voltage by magnetic shunt paths in the transformer core. However, such regulation is not adequate or sufficient for the charging of batteries, where it is desirable to regulate the charging voltage at the battery in accordance with the conditions in the battery and particularly the state of charge of the battery. Preferably, a tapering voltage is provided to prevent overcharge which may be harmful to the battery.

The alternating current output from the power secondary winding X is rectified by a full-wave rectifier R to create the necessary direct current for charging of the battery. The rectifier R may be of the bridge type, as shown, or the winding X may have a center tap for use with a two diode full-wave rectifier. The power secondary X of the transformer T is also shunted by switching means including a silicon controlled rectifier SCR and by a voltage divider consisting of a resistor R1 of 5,600 ohms, a potentiometer Y of 1,500 ohms and a second resistor R2 of 5,600 ohms connected in series. A sliding adjustable arm Z of the potentiometer Y is connected to an input terminal 21 of a trigger control device D (commercially available from General Electric Company as GE-2N4988 Trigger) consisting of two transistors complementarily connected and a zener diode 22. The output of the trigger control device D is connected to a gate G of the controlled rectifier SCR. An anode A of the controlled rectifier SCR is connected through a signal lamp 23 which shunts a heater resistor H to one side of the secondary winding X and the cathode K of the controlled rectifier SCR is connected to the other side of the secondary winding X. A resistor R3 may be connected between the gate G and the cathode K. The optional resistor R3 functions to minimize spurous firing of the controlled rectifier SCR. When the potential across the voltage divider is of a sufficient level and of the correct polarity, a positive voltage pulse is applied to the gate G by the trigger control device D to fire the controlled rectifier SCR, thereby connecting the signal lamp 23 and the shunt heater coil H directly across the power secondary winding X. The heater coil H and lamp 23 are of a sufficiently low total resistance as to substantially short the power secondary winding X. As used herein, when the secondary winding is "substantially shorted" it is operating in its current limiting mode and the output voltage is clipped to a level suitable for float charging the battery.

The resistor H is in heat conducting relation with a negative temperature coefficient thermistor I. The thermistor I is connected in shunt with the resistor R1. When the temperature of the thermistor I is increased by the application of heat by the heater resistance H, its resistance will decrease, thereby changing the voltage relations in the voltage divider to increase the potential applied thereby at the input 21 of the trigger device D. The thermistor I may have a resistance at 38°C. of 538,000 ohms which will decrease to about 38,000 ohms at 104°C. A tolerance of ± 10 percent through this range is acceptable. When the alternating current from the power secondary winding X reverses, the controlled rectifier SCR will no longer conduct. Then when the voltage applied to the controlled rectifier SCR is again reversed, a sufficient positive voltage condition at the gate G, as controlled by the trigger device D, causes intermittent firing of the controlled rectifier SCR. As the controlled rectifier SCR is intermittently fired, the lamp 23 blinks as a visual signal and the heater resistance H applies more heat to the thermistor I to further modify the voltage conditions in the voltage divider until charging of the battery substantially ceases. At this time, the lamp 23 will flash continuously and slowly, indicating a fully-charged battery.

It will be noted that the controlled rectifier SCR of the circuit shown in FIG. 1 affects both half cycles of the alternating current applied to the rectifier R. This is because of leakage reactance in the ferroresonant transformer T between the low voltage load winding X and the high voltage resonant winding S. When the controlled rectifier SCR is fired to substantially short circuit the load winding X, it is at a point in time earlier than the normal reversal or commutating point in the resonant circuit comprising the winding S and the capacitor C. This results in a residual magnetization of the transformer core 12 which lowers the output during the next half-cycle. In effect, there is a shift in the B–H curve of the core 12 during the next half-cycle. The high leakage reactance between the windings X and S also prevents the controlled rectifier SCR from acting as a full short circuit on the resonant winding S.

Firing the controlled rectifier R also changes the voltage relations at the voltage divider by causing the heater coil H to heat the thermistor I. This lowers the resistance of the thermistor I which shunts the upper resistor R1 of the voltage divider and increases the voltage at the input 21 of the trigger device D to fire the controlled rectifier SCR earlier in a half-cycle. At the same time, the signal lamp 23 creates a visual indication to an operator of the battery condition of charge, particularly of the fully-charged condition. If desired, the fully-charged battery can remain in the charging circuit on float since the advanced firing of the controlled rectifier reduces the voltage applied to the battery. The charge rate also can be controlled by the operator by adjusting the position of the slide Z of the potentiometer Y. Furthermore, the circuit has an advantage in that the alternating current must be applied to the circuit components to operate the signal lamp 23. In the event of a power failure in the primary winding P, the battery B cannot be discharged by the signal lamp or the SCR voltage divider due to the non-reversible conduction of the rectifier R.

Figure 2:
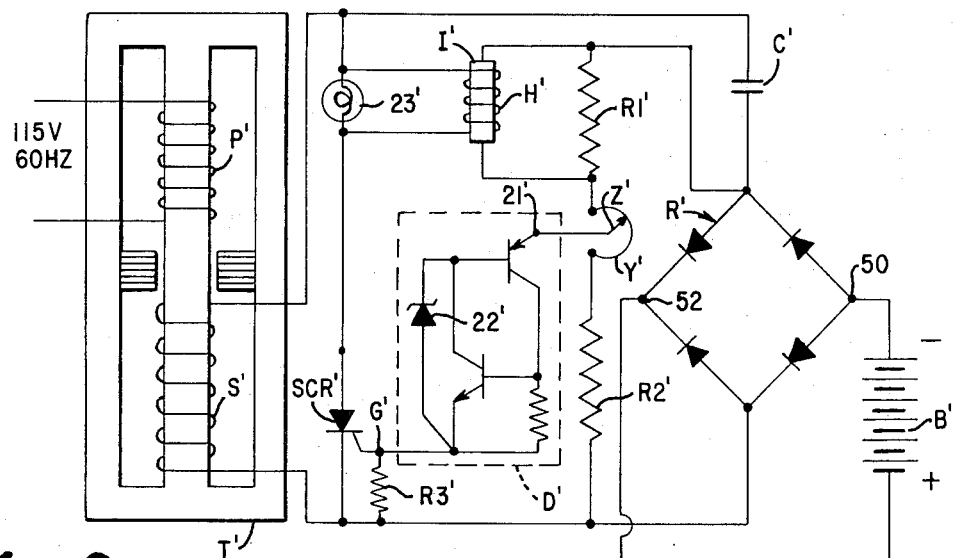
FIG. 2 is a schematic diagram of a similar but modified circuit for charging batteries which incorporates the invention for controlling constant current output with the resonating secondary winding of a ferroresonant transformer used as the power source.

In the circuit shown in FIG. 2, a similar arrangement is utilized, here, however, a resonating secondary winding S' of a ferroresonant transformer T' becomes the constant-current power source with a limited voltage ceiling, thereby serving a dual function. A primary winding P' is energized from a 110 volt alternating current source as before. A capacitor C' is connected in series between the secondary winding S' and a full wave rectifier R' to form a resonant circuit to provide a regulated output from the transformer T'. The voltage divider consists of a resistance R1', a potentiometer Y' and a resistance R2' which shunt the full wave rectifier R'. A battery B' is shown connected between outputs 50 and 52 of the rectifier R'. A slider Z' of the potentiometer Y' of the voltage divider is connected to an input 21' of the trigger device D' which controls the gate G' of a controlled rectifier SCR', which is connected as before to a signal lamp 23' and a heater coil H'. The heater H' is positioned around a thermistor I' which is connected in parallel with resistor R1' as before.

It will be understood that in the broadest aspect of the invention, the heating coils H and H' and the thermistors I and I' may be omitted from the circuits shown in FIGS. 1 and 2. This will eliminate the tapering charge yet will still actuate the signal lamp 23 or 23' to indicate by its blinking the condition of charge of the batteries B and B'.

Figure 3:
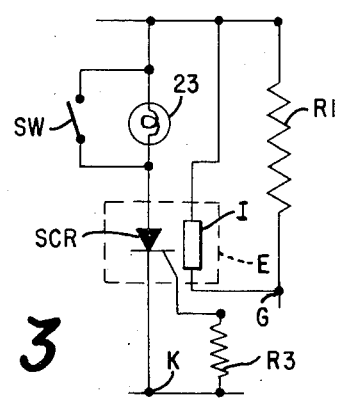
FIG. 3 is a modification of the thermistor control portion of the circuits of FIGS. 1 and 2.

Referring to FIG. 3, a change in a portion of the circuit is shown which can be applied to the circuits of either FIGS. 1 or 2. The heating coils H and H' are omitted. Heat generated internally in the controlled rectifier SCR during operation is utilized to heat the thermistor I which again is connected across the resistor R1 of the voltage divider. The thermistor I is juxtaposed in touching relation with the rectifier SCR to facilitate heat transfer between them. If desired an encapsulation of a heat conducting resin E, or the like, may be used for this purpose to completely enclose the two circuit elements. The lamp 23 is again connected in series with the rectifier SCR, if desired, as an indicating means. The lamp 23 may be shorted by a manual switch SW should no indicating means be desirable or necessary. It will be appreciated that where no visual indicator is needed, the lamp 23 may be eliminated and the controlled rectifier SCR is then connected directly across the output of the transformer T. The lamp 23 can also be replaced with other suitable types of alarms, such as an audible alarm or a relay which controls an external circuit.

Ferroresonant transformers such as shown in FIG. 1 used for voltage regulation supplied to a load for variations of voltage on the primary are well known and their mode of operation will not be further discussed. The present invention discloses circuits where additional voltage regulation is supplied which preferably uses a single silicon controlled rectifier or similar switching device operating during all or part of one-half cycle only of the alternating current supply to control the output voltage to a load during both half-cycles. The controlled rectifier SCR has the characteristic that as a switching device it becomes non-conducting upon a voltage reversal and therefore conducts in only one direction. The regulation is calibrated by a well-known commercially available trigger device D which depends on a zener diode 22 to control gating of the controlled rectifier SCR in accordance with a potential provided by a manually controllable voltage divider. The potential provided by the voltage divider preferably is automatically varied by the thermistor I which is in shunt with the resistor R1 of the voltage divider. However, it will be apparent that the thermistor I also may be connected in parallel with other portions of the voltage divider or in series in one branch of the voltage divider. Depending upon its location, the thermistor I may have either a positive or a negative temperature coefficient. When the temperature of the thermistor I is raised by the addition of heat resulting from current through the rectifier SCR, the resistance of the thermistor I is lowered. The lowering of the resistance of the thermistor I has the effect of lowering the resistance of the shunt circuit including the resistance R1 to increase the potential supplied to the zener diode 22. This will recalibrate the voltage ratios in the circuit to provide a higher voltage to the gate G. Thus, a lower voltage on the voltage divider will trigger the rectifier SCR and the rectifier SCR begins to operate with greater frequency and earlier in the half-cycle to short-circuit the secondary load winding to reduce its output voltage by a clipping action. It will be appreciated that the device can be operated not only to control voltage to the output but also to control current to the output.

The short-circuit of the secondary load coil X by the controlled rectifier SCR for one half-cycle, is not sufficient to throw the circuit out of its resonance condition. As stated above, this is attributable to the leakage reactance coupling between the low voltage load winding X and the high voltage capacitance winding S.

There is not a full short-circuit of the load winding X through the SCR. The partial short-circuit allows recovery up to the point on the next half-cycle until the controlled rectifier SCR fires again in the following half-cycle.

The circuit shown in FIG. 1 is used to advantage as a charging device for the battery B. The potentiometer Y can be manually adjusted to apply a higher voltage during initial charging operations which will be automatically reduced when the controlled rectifier SCR begins to operate to perform its clipping operation by short-circuiting the power winding and thereafter to maintain a lower voltage on the battery during the final charging operation and when the battery is on a float charge, which will be indicated by the blinking of the lamp 23. The circuit shown in FIG. 2 operates in substantially the same mode except that here the secondary power winding is omitted and the power to charge the battery is obtained from the resonating secondary winding S'. This simplifies the device to improve its commercial feasibility.

Although it is preferable to use a single controlled rectifier in the above-described circuits for substantially shorting the output of the ferroresonant transformer during half-cycles of only one polarity, it has been found that the output may also be substantially shorted during portions of half-cycles of both polarities. This is accomplished by using a controlled rectifier such as a triac or back-to-back silicon controlled rectifiers. However, this embodiment is more expensive than and offers no improvement over using a single silicon controlled rectifier.

It will be appreciated that various modifications and changes may be made in the above-described circuits without departing from the spirit and the scope of the claims.

What we claim is:

1. An improved circuit for charging a battery comprising, in combination, a ferroresonant transformer having an alternating current output, means for rectifying such alternating current output to obtain a direct current for charging a battery, a switch means including a controlled rectifier connected across said transformer output responsive to half-cycles of such alternating current output of one polarity, said half-cycles exceeding a predetermined voltage for triggering said controlled rectifier which substantially short circuits such alternating current output during the remainder of such half-cycles, means for modifying the level of voltage of said half-cycles including a thermistor, means responsive to an increasing average current through said controlled rectifier for heating said thermistor, and means decreasing the level of said voltage as said thermistor is heated.

2. An improved battery charging circuit as set forth in claim 1, wherein the means for modifying the level of the voltage of said half-cycles includes a voltage divider cooperating with the thermistor.

3. An improved battery charging circuit, as set forth in claim 2, wherein said heating means includes an electric heater connected to heat said thermistor, and wherein said means connecting said controlled rectifier across said transformer output connects said heater in series with said controlled rectifier whereby an increased current flow through said controlled rectifier increases the temperature of said thermistor to decrease said predetermined voltage.

4. An improved battery charging circuit, as set forth in claim 3, and including an indicator lamp connected in parallel with said heater to visually indicate the level of the current through said controlled rectifier.

5. In combination with a high reactance alternating current power source, a full-wave rectifier to supply direct current to a load, a voltage divider shunting the power source and including a thermistor connected to vary the voltage at a tap in said voltage divider in response to temperature changes, a controlled rectifier, means connecting said controlled rectifier in shunt with the power source to substantially short said power source for the remainder of one half-cycle when gated to conductive condition, trigger means responsive to the tap voltage in said voltage divider to gate said controlled rectifier to conductive condition during such half-cycles when the tap exceeds a predetermined voltage, and means responsive to current flow in said controlled rectifier to vary the temperature of said thermistor to modify the voltage at said voltage divider tap applied to said trigger means.

6. The device defined in claim 5 wherein said means responsive to current flow in said controlled rectifier includes an electric heater connected in the controlled rectifier circuit for heating said thermistor.

7. The device defined in claim 6 and including an indicating lamp connected in shunt with said heating coil.

8. The device defined in claim 5 wherein said alternating current power source includes a ferroresonant transformer with a power secondary winding and a resonating secondary winding.

9. The device defined in claim 5 wherein said alternating current power source includes a ferroresonant transformer with a resonating secondary which also supplies the power to the load.

10. The device defined in claim 5 wherein said means responsive to current flow in said controlled rectifier includes means mounting said thermistor in a heat conducting relationship with said controlled rectifier.

11. The device defined in claim 9 wherein said mounting means includes an encapsulating body of heat conducting resin.

12. The device defined in claim 5 wherein said voltage divider includes a potentiometer for adjusting the voltage applied to said trigger means.

* * * * *